United States Patent [19]

Haraga et al.

[11] Patent Number: 4,996,539
[45] Date of Patent: Feb. 26, 1991

[54] LABEL PRINTER

[75] Inventors: Koichi Haraga, Numazu; Kazuhide Takahama, Shizuoka; Mitsuo Uchimura, Numazu, all of Japan

[73] Assignee: Tokyo Electric Co., Ltd., Tokyo, Japan

[21] Appl. No.: 465,517

[22] Filed: Jan. 16, 1990

Related U.S. Application Data

[63] Continuation of Ser. No. 211,423, Jun. 24, 1988, abandoned.

[30] Foreign Application Priority Data

Jun. 30, 1987 [JP] Japan .................................. 62-161058

[51] Int. Cl.[5] .................. G01D 15/10; B41J 45/00; G06K 7/10
[52] U.S. Cl. ................ 346/76 PH; 346/136; 235/385; 235/462; 156/348; 156/DIG. 47; 400/120; 101/66; 101/288
[58] Field of Search .......... 346/76 PH, 136; 101/66, 101/288; 156/348, DIG. 47; 235/385, 462; 400/120

[56] References Cited

U.S. PATENT DOCUMENTS

| 4,440,248 | 4/1984 | Teraoka | 177/4 |
| 4,630,538 | 12/1986 | Cushman | 101/66 X |
| 4,765,765 | 8/1988 | Futanata | 101/288 X |

Primary Examiner—Bruce A. Reynolds
Assistant Examiner—Gerald E. Preston
Attorney, Agent, or Firm—Frishauf, Holtz, Goodman & Woodward

[57] ABSTRACT

A label printer includes a thermal printer section and a keyboard. The label printer further includes an I/O port to which a memory card storing information of label issuing condition including a preset number of printing formats is electrically connected, and a printing control circuit including a CPU, ROM, RAM and printer controller and for selectively reading out printing format data from the memory card when it is detected that the memory card is connected to the I/O port, setting a printing format corresponding to the readout printing format data, and driving the thermal printer section to print printing data supplied from the keyboard according to the set printing format.

7 Claims, 4 Drawing Sheets

LABEL PRINTER

This is a continuation of Ser. No. 211,423, filed Jun. 24, 1988 now abandoned.

BACKGROUND OF THE INVENTION

1. Field of the Invention

This invention relates to a label printer.

2. Description of the Related Art

Bar codes have been widely used for administration of sales items. The bar code has white and black bars arranged to express the manufacture of the sales item, the item code and the like. The bar code is sometime printed directly on the item, but in general, it is printed on a label and then the label is attached on the item. The label may be provided in the form of a seal or tag. The seal is often used for items such as fresh foods, and the tag is often used for items such as clothing. Further, the bar code label is used to show information such as the name of article and the price in addition to the bar code.

The bar code label is issued when necessary by use of a label printer installed in a store. A typical label printer is so designed as to display, on a CRT display, printing data such as message data and bar code data entered by the key operation on a keyboard, and issue a label on which the printing data is printed in a preset printing format. In this case, the layout on the bar code label, or the printing positions of the message and bar code and the form of the bar code are determined according to the printing format.

The layout of the bar code label greatly differs depending on the field of items dealt with by the users of the label printer. Therefore, the following two types of label printers have been developed in which a desired one of various printing formats can be selectively used, for example. The first type of label printer includes a ROM storing various printing formats, and the second type of label printer includes a ROM storing a format forming program which can be used to form various printing formats.

However, the above label printers are not suitable when they are used by many operators dealing with different fields of items or articles in large scale stores such as department stores. That is, it becomes necessary to increase the memory capacity of the ROM in order to increase the number of selectable printing formats in the first type label printer. In this case, the manufacturing cost will increase with increase in the versatility of the label printer. The memory capacity of the ROM in the second type label printer which is required to prepare a preset number of printing formats may be set smaller than that in the first type label printer. However, it is necessary to modify the format forming program for each store. The modification of the format forming program is relatively complicated, increasing the manufacturing cost as well as in the first type label printer.

SUMMARY OF THE INVENTION

An object of this invention is to provide a label printer which is capable of issuing desired printing formats without increasing the manufacturing cost.

The above object can be attained by a label printer which comprises a printing section; a key input section; an input port to which a memory card storing information of label issuing condition including a preset number of printing formats is removably connected; and a control unit for selectively reading out printing format data from the memory card when it is detected that the memory card is connected to the input port, setting a printing format corresponding to the readout printing format data, and driving the printing section to print printing data supplied from the key input section according to the set printing format.

In the above label printer, the printing format data can be read out from the memory card which can be physically separated from the label printer and is used to set the printing format. Thus, the same label printer can be used to issue labels having printing data printed thereon according to the desired printing format by using various exclusive memory cards for respective fields of sales articles.

DETAILED DESCRIPTION OF THE PREFERRED EMBODIMENTS

Figure 1:
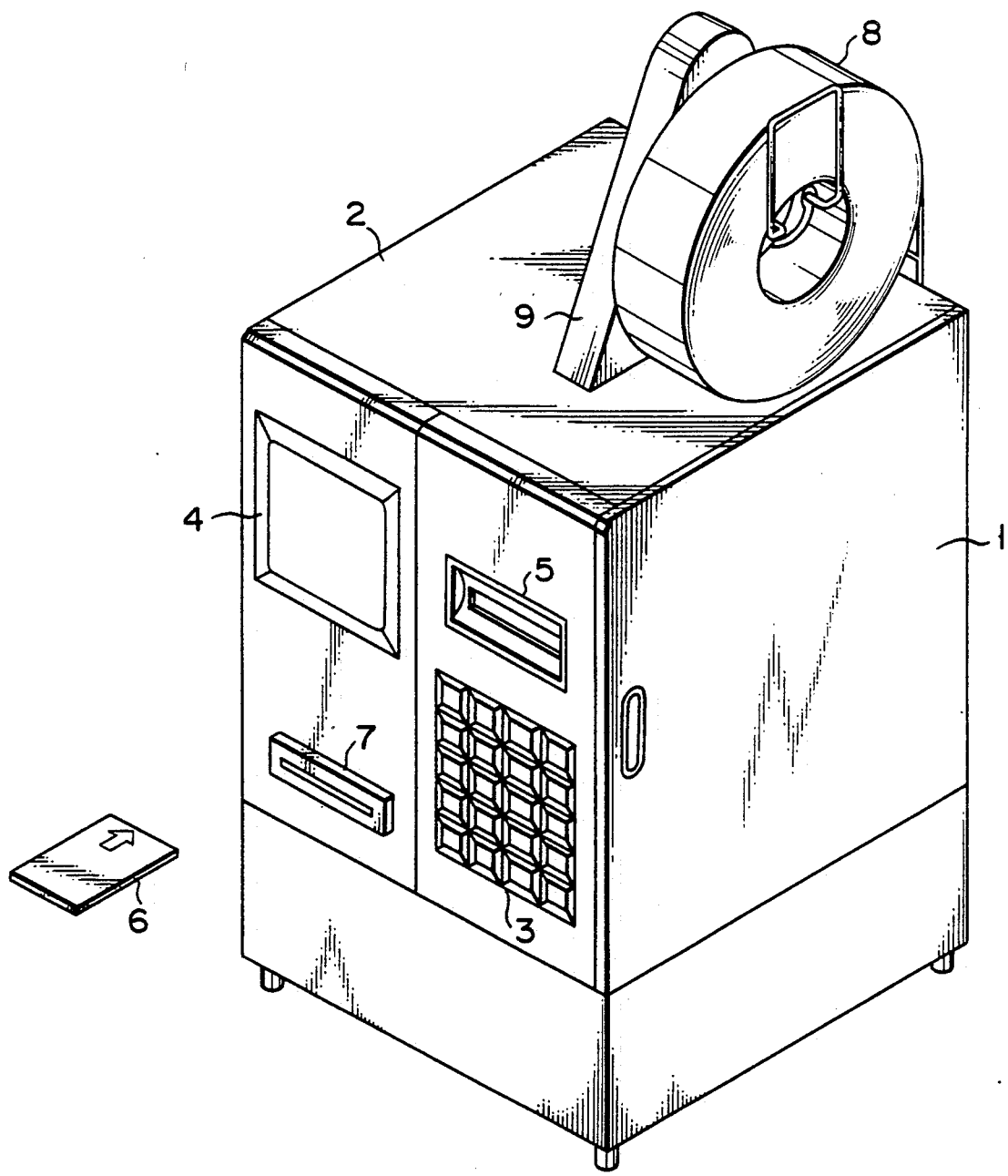
FIG. 1 is a perspective view of a label printer according to one embodiment of this invention.

There will now be described a label printer according to an embodiment of this invention with reference to FIGS. 1 and 2. FIG. 1 is a perspective view of the label printer. The label printer includes door 1, housing 2, keyboard 3, CRT display 4, label issuing slot 5, card inlet 7 and holding member 9. Door 1 is provided on the side surface of housing 2, and keyboard 3 is arranged on the front panel of housing 2. Keyboard 3 is used to input printing data such as message data and bar code data. For example, article name and amount are input as message data, and the article code is input as bar code data. Display 4 is used to display input printing data, for example. Holding member 9 is mounted on the upper side of housing 2 to hold rolled label paper 8 on which per-printed labels are attached at a regular interval. Memory card 6 is inserted into inlet 7 at the time of issuing a label. The bar code label is issued from label issuing slot 5. Further, the label printer has a connecter and a power switch on the rear side of housing 2. The connector is connected to host computer 18 so as to permit transfer of printing data and printing format data between the label printer and host computer 18.

Figure 2:
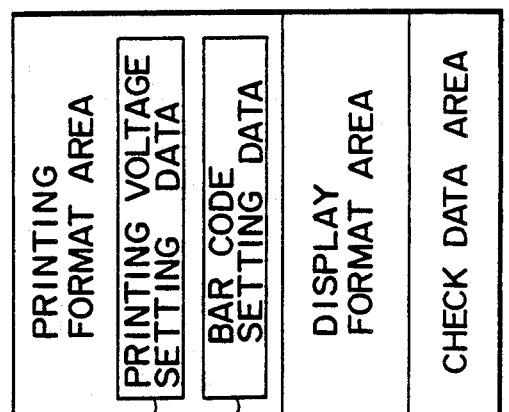
FIG. 2 is a circuit diagram of the label printer shown in FIG. 1.

FIG. 2 is a circuit diagram of the label printer. The label printer includes CPU 10, ROM 12, RAM 13, printer controller 15, key sense circuit 16, display controller 17, communication interface 19 and I/O port 20. These elements are connected to one another via bus line 11 including address bus and data bus. ROM 12 includes memory area PM1 for storing the control program for CPU 17, memory area PM2 constituting character generators for various kinds of languages, and memory are PM3 for storing one standard printing format data and one standard display format data. RAM 13 is used to temporarily store I/O data of CPU 17, for example, input data form keyboard 3. Key sense circuit 16 senses a key signal from keyboard 3, and the sensed key signal is converted to an ASCII code which can be processed as input data by CPU 10. The display operation of CRT display 4 is controlled by means of displays controller 17. Communication interface 19 is used to control the data transfer with respect to host computer 18. I/O port 20 is used to access memory card 6 which is detachably inserted into card inlet 7. Further, the label printer includes thermal printer section 14 for performing the printing operation due to thermal transfer effect. The printing operation of thermal printer section 14 is controlled by means of printer controller 15. For the control operation, printer controller 15 generates motor control signal S1, latch control signal S2, data signal S3 and clock signal S4.

Thermal printer section 14 includes stepping motor 21 for feeding label paper 8, motor driver 22 for driving motor 21 in response to motor control signal S1, thermal head 23 for effecting the one-line printing operation, shift register 26 for sequentially storing one-line printing pattern data serially supplied as data signal S3 in response to clock signal S4, latch circuit 25 for latching one-line printing pattern data stored in shift register 26 in response to latch control signal S2, and head driver 24 for driving thermal head 23 according to one-line printing pattern data latched in latch circuit 25. A printing voltage is applied to thermal head 23 from printer controller 15 via output line P.

Figure 3:
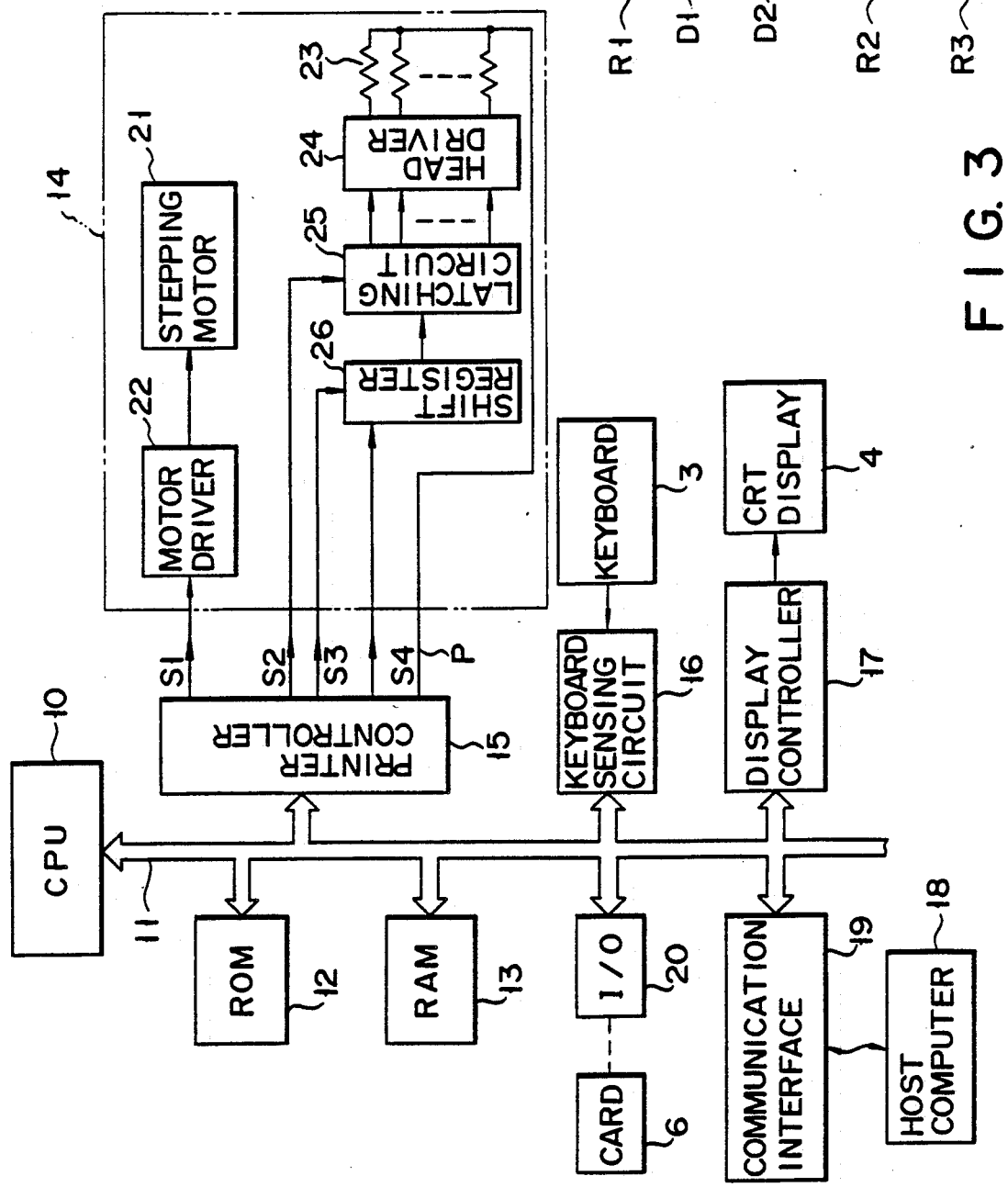
FIG. 3 shows the memory area of a memory card to be connected to the label printer shown in FIG. 2.

FIG. 3 is a diagram showing the memory areas of memory card 6. As shown in FIG. 3, memory card 6 includes printing format area R1 for storing a plurality of desired printing format data for a specified user, display format area R2 for storing a plurality of desired display format data for the specified user, and check data area R3 for storing check data used for permitting the thermal printing to empirically print data such as bar code. The printing format data in printing format area R1 includes data specifying the printing position of the message and bar code, data specifying the type of a character generator, and printing speed specifying data. The printing format data further includes printing voltage setting data D1 for setting the printing voltage applied to thermal head 23 and bar code setting data D2 for setting the bar code pattern size. In addition, one display format data includes input request data so as to display that message in the standard language of a specified country which requests a printing format specifying code to be input.

Figure 4:
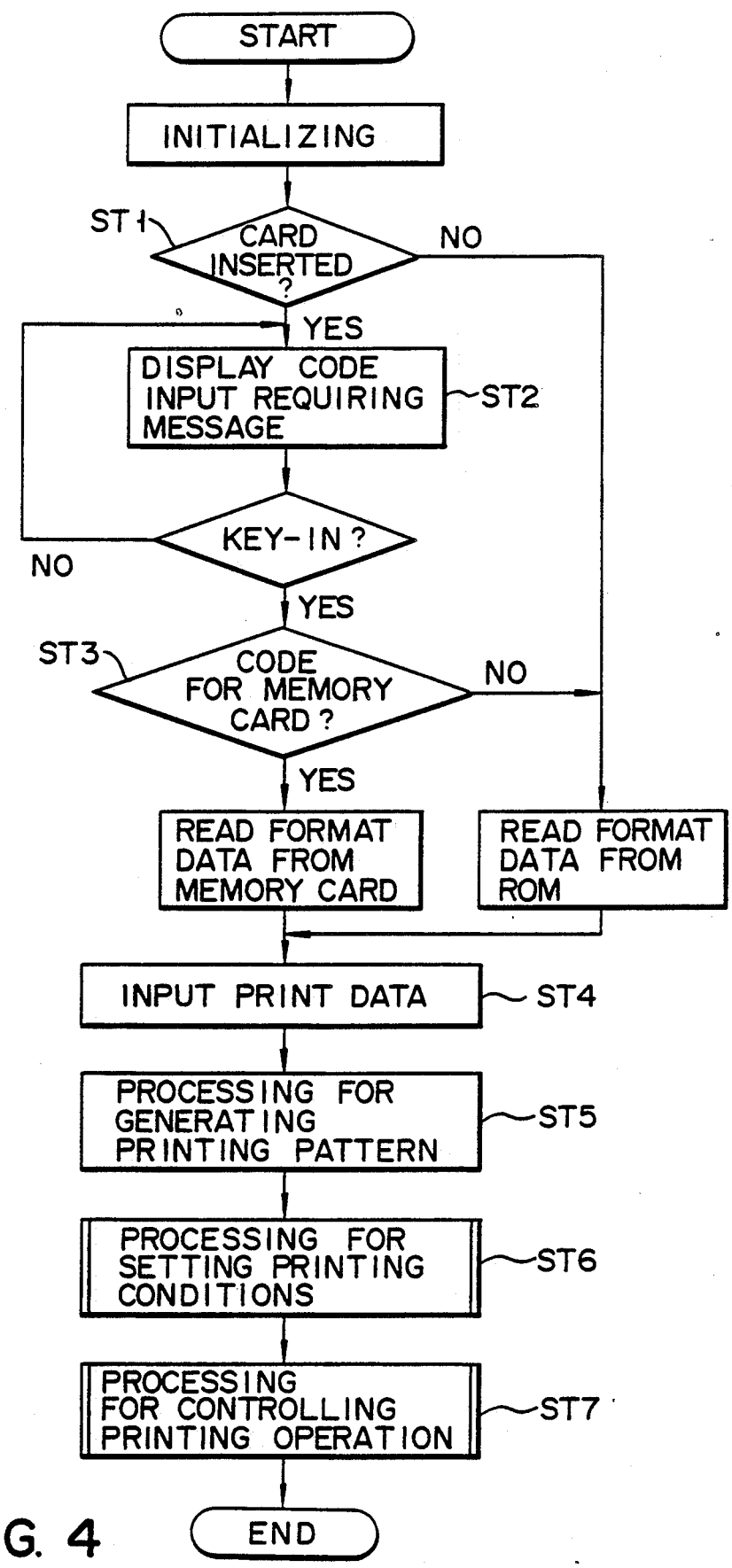
FIGS. 4 to 6 are flowcharts illustrating the operation of the label printer shown in FIGS. 1 and 2.

When the power source is turned on, CPU 10 sequentially reads out the control program from ROM 12. In a case where host computer 18 is not in on-line connection with the printing control circuit, the printing control circuit is operated according to the flowchart shown in FIG. 4. When the operation is started, a preset initialization process is effected. Then, it is checked in step ST1 whether or not memory card 6 is inserted into card inlet 7. When memory card 6 is inserted, display format data including input request message data is read out from memory card 6 and the input request message data is displayed in the standard language of the specified country on CRT display 4 in step ST2. For example, when a memory card for U.S.A. is inserted, input request message of "input-format-code ?" is displayed in English. Further, when a Japanese memory card is used, the input request message is displayed in Japanese.

When a code specifying a desired printing format is input from keyboard 3, it is checked in step ST3 whether or not the input code specifies the printing format data stored in memory card 6. If the printing format data stored in memory card 6 is specified, the printing format data and display format data specified by the input code are read out from memory card 6. If the printing format data specified by the input code is not stored in memory card 6, the standard printing format data and display format data are read out from ROM 12. Further, when it is detected in step ST1 that memory card 6 is not inserted, the standard printing format data and display format data are read out from ROM 12. The printing format and display format are respectively determined by the readout printing format data and display format data.

After this, it becomes ready for inputting printing data by operating keys on keyboard 3 in step ST4. When message data such as the article name and the amount and bar code data such as an article code are input from keyboard 3, input printing data is displayed in the set display format on CRT display 4. Then, the printing pattern formation processing is effected based on the set printing format in step ST5. In the pattern formation processing, input printing data of character or numeral is converted from the ASCII code into dot data by means of the specified character generator, and is arranged with the specified bar code format in the specified printing position.

Figure 5:
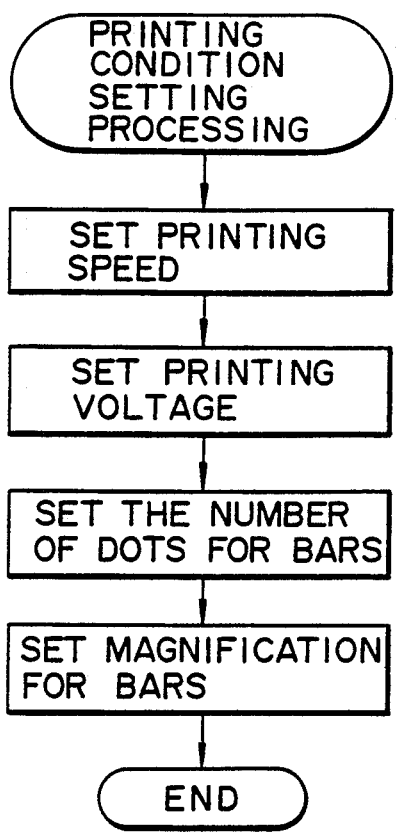

Next, the printing condition setting processing shown in FIG. 5 is effected based on the specified printing format in step ST6. In the printing condition setting processing, the printing speed is determined according to printing speed setting data, the printing voltage of thermal head 23 is determined by voltage setting data D1, and the width of the bar code pattern is determined by bar code setting data D2.

Figure 6:
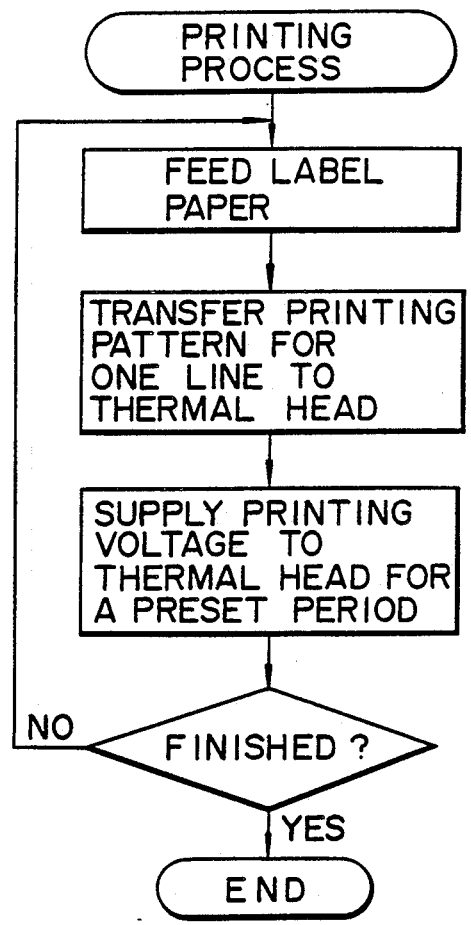

After this, the printing process shown in FIG. 6 is effected in step ST7. In the printing process, label paper 8 is fed by driving stepping motor 21, one-line of printing pattern is supplied to thermal head 23, and the printing operation voltage is applied to thermal head 23 for a preset period of time. The operation is repeatedly effected until all the printing pattern is printed. The label on which all the printing data is printed is fed to label issuing slot 5.

Figure 7:
FIG. 7 shows an example of a bar code label issued from the label printer shown in FIGS. 1 and 2.

FIG. 7 shows an example of a label thus obtained. The kind of character and the printing position of the bar code and character such as article name "SWEATER" and amount "$56.7" are determined by the specified printing format.

In the embodiment described above, exclusive memory cards 6 can be prepared for respective users requiring printing data printed in their own printing formats, and therefore all the users can use the same label printer to obtain labels printed in their own printing formats. In this case, it is only necessary to store standard printing format data and display format data in ROM 12, and the memory capacity of ROM 12 can be suppressed to a minimum. Thus, the manufacturing efficiency can be highly enhanced. Further, memory card 6 can be detachably inserted, and therefore memory card 6 used can be easily changed.

There are different types of labels such as seal and tag used in the label printer. In case where the thermal head is used to print data on the label, the printing quality largely depends on the type of label used. In this embodiment, printing voltage setting data is provided in printing format data stored in memory card 6, and voltage applied to thermal head 23 is determined by the printing voltage setting data. Therefore, it is possible to selectively set the voltage applied to thermal head 23 based on the type of label used so that high printing quality can be always attained.

The bar code construction is normalized. However, it is sometimes required for the users to change the width of the bar code pattern. Even in such case, since dot numbers for the narrow and wide bar code patterns are stored as part of bar code setting data D2 in memory card 6 in this embodiment, it is easy to obtain a label with a bar code pattern having a required width.

In this embodiment, memory card 6 can be formed to store display format data specifying display formats required by the user. Therefore, the message can be displayed in an language which can be understood by the user of memory card 6. This is extremely advantageous in a case where the label printers are manufactured according to the specifications of different countries.

Further, since check data is stored in memory card 6, the operation test of the label printer can be easily effected according to the checking data with memory card 6 inserted into the label printer. For this reason, it becomes easy to control the printing precision and the like in the maintenance procedure of the label printer.

Data can be easily written into memory card 6 by use of a simplified type microcomputer. This is, the computer is first connected to the label printer with memory card 6 inserted therein, and then format data corresponding to the requirements of the users is transferred from the computer to memory card 6 and is written into memory card 6. Thus, memory card 6 having desired format data stored therein can be obtained. In this way, memory card 6 can be formed in the sales agent or the like, and therefore the requirements of the user can be easily satisfied.

In a case where memory card 6 is used as the data storing medium, it is possible to access memory card 6 after it is connected to bus line 11 via I/O port 20. Therefore, it is easy to attain the above effect with a simple construction. It is also possible to use a floppy disk as the data storing medium, but in this case, a disk drive unit is necessary, enhancing the manufacturing cost.

Further, in the embodiment described above, one set of printing format data and display format data is stored in ROM 12, but the number of sets can be increased as required. It is also possible to store a plurality of programs in ROM 12 in order to form a plurality of printing formats and display formats.

What is claimed is:

1. A label printer comprising:
    input means for inputting printing data;
    a built-in memory including at least one standard printing format stored therein;
    an inlet port for receiving memory cards each of which includes at least one optional printing format stored therein, said memory cards being selectively and detachably connectable to said inlet port;
    printing means for printing the printing data input from the input means on a label; and
    control means including means for selecting one of the printing formats stored in the built-in memory and a received memory card, means for driving the printing means to print the input printing data in the selected printing format, and means for inhibiting an optional printing format from being selected by said selecting means when it is detected that no memory card is received in and connected to said inlet port.

2. A label printer according to claim 1, wherein said control means further includes:
    means for displaying a predetermined message and the input printing data; and
    means for driving said display means to display the predetermined message and the input printing data in a display format stored in a memory card.

3. A label printer according to claim 2, wherein:
    said printing means includes a thermal head; and
    said control means further includes means for changing a printing voltage applied to said thermal head in accordance with printing voltage setting data included in an optional printing format stored in a memory card.

4. A label printer according to claim 3, wherein said control means further includes means for changing a pattern size of the input printing data in accordance with size setting data included in the optional printing format stored in a memory card.

5. A label printer according to claim 4, wherein said control means further includes means for driving said display means to display the predetermined message and the printing data in a display format stored in said built-in memory when no memory card is received in and connected to said inlet port.

6. A label printer according to claim 1, wherein:
    said printing means includes a thermal head; and
    said control means further includes means for changing a printing voltage applied to said thermal head in accordance with printing voltage setting data included in the optional printing format stored in a memory card.

7. A label printer according to claim 1, wherein said control means further includes means for changing a pattern size of the printing data in accordance with size setting data included in an optional printing format stored in a memory card.

* * * * *